United States Patent
Chen et al.

(10) Patent No.: US 7,582,137 B2
(45) Date of Patent: Sep. 1, 2009

(54) FUEL DEOXYGENATOR WITH NON-PLANAR FUEL CHANNEL AND OXYGEN PERMEABLE MEMBRANE

(75) Inventors: Alexander G. Chen, Ellington, CT (US); Louis J. Spadaccini, Manchester, CT (US); Louis Chiappetta, South Windsor, CT (US); Haralambos Cordatos, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 518 days.

(21) Appl. No.: 11/334,587

(22) Filed: Jan. 18, 2006

(65) Prior Publication Data

US 2007/0163433 A1    Jul. 19, 2007

(51) Int. Cl.
*B01D 53/22* (2006.01)
(52) U.S. Cl. ............ 95/46; 95/54; 96/6; 96/7; 96/11; 96/12; 55/524; 210/640
(58) Field of Classification Search ............ 96/6, 96/7, 11, 12, 13, 14; 95/46, 54; 55/523, 55/524; 210/640, 641, 650
See application file for complete search history.

(56) References Cited

U.S. PATENT DOCUMENTS

| | | | |
|---|---|---|---|
| 4,371,385 A | 2/1983 | Johnson | |
| 4,516,984 A | 5/1985 | Warner et al. | |
| 4,602,923 A | 7/1986 | Bernstein | |
| 4,729,773 A | 3/1988 | Shirato et al. | |
| 4,955,992 A | 9/1990 | Goodale et al. | |
| 5,053,060 A | 10/1991 | Kopf-Sill et al. | |
| 5,078,755 A | 1/1992 | Tozawa et al. | |
| 5,094,749 A | 3/1992 | Seita et al. | |
| 5,123,937 A | 6/1992 | Shibata et al. | |
| 5,154,832 A | 10/1992 | Yamamura et al. | |
| 5,194,158 A * | 3/1993 | Matson ...................... | 95/46 |
| 5,340,384 A | 8/1994 | Sims | |
| 5,410,052 A | 4/1995 | Smith et al. | |
| 5,482,860 A | 1/1996 | Copeland et al. | |
| 5,522,917 A | 6/1996 | Honda et al. | |
| 5,693,122 A | 12/1997 | Berndt | |
| 5,695,545 A | 12/1997 | Cho et al. | |

(Continued)

FOREIGN PATENT DOCUMENTS

DE           3306500           8/1984

(Continued)

OTHER PUBLICATIONS

European Search Report dated Aug. 8, 2007.

(Continued)

*Primary Examiner*—Jason M Greene
(74) *Attorney, Agent, or Firm*—Carlson, Gaskey & Olds, PC

(57) ABSTRACT

A device for use in a fluid system includes a flow perturbation element within a fluid channel. The flow perturbation element has a gas permeable surface for removing dissolved gas from passing fluid. A gas permeable membrane is coated on the gas permeable surface and allows the dissolved gas transport out of passing fluid into a gas-removal channel. The gas permeable membrane may be coated on the fuel perturbation elements using any of a variety of methods.

49 Claims, 8 Drawing Sheets

U.S. PATENT DOCUMENTS

| | | | |
|---|---|---|---|
| 5,830,261 A * | 11/1998 | Hamasaki et al. | 96/6 |
| 5,888,275 A | 3/1999 | Hamasaki et al. | |
| 5,902,382 A | 5/1999 | Campain et al. | |
| 5,902,747 A | 5/1999 | Nemser et al. | |
| 6,015,607 A * | 1/2000 | Fraivillig | 428/214 |
| 6,106,591 A | 8/2000 | Keskar et al. | |
| 6,168,648 B1 | 1/2001 | Ootani et al. | |
| 6,258,154 B1 | 7/2001 | Berndt et al. | |
| 6,309,444 B1 | 10/2001 | Sims et al. | |
| 6,315,815 B1 * | 11/2001 | Spadaccini et al. | 95/46 |
| 6,379,796 B1 | 4/2002 | Uenishi et al. | |
| 6,402,810 B1 | 6/2002 | Mayer et al. | |
| 6,402,818 B1 | 6/2002 | Sengupta | |
| 6,494,938 B2 | 12/2002 | Sims et al. | |
| 6,616,841 B2 | 9/2003 | Cho et al. | |
| 6,623,637 B1 | 9/2003 | Monzen et al. | |
| 6,632,357 B1 | 10/2003 | Barget et al. | |
| 6,682,016 B1 | 1/2004 | Peroulakis | |
| 6,709,492 B1 | 3/2004 | Spadaccini et al. | |
| 7,393,388 B2 * | 7/2008 | Spadaccini et al. | 96/6 |
| 2001/0035093 A1 | 11/2001 | Yokota | |
| 2002/0195385 A1 | 12/2002 | Cho et al. | |
| 2003/0116015 A1 | 6/2003 | Sengupta et al. | |
| 2003/0148164 A1 | 8/2003 | Koch et al. | |
| 2003/0151156 A1 | 8/2003 | Crumm et al. | |
| 2003/0161785 A1 | 8/2003 | Dieckmann | |
| 2003/0219637 A1 | 11/2003 | Coors | |
| 2004/0025696 A1 | 2/2004 | Varrin, Jr. et al. | |
| 2004/0028988 A1 | 2/2004 | Bunker | |
| 2004/0050786 A1 | 3/2004 | Dey et al. | |
| 2004/0094463 A1 | 5/2004 | Laverdiere et al. | |
| 2004/0194627 A1 * | 10/2004 | Huang et al. | 96/6 |
| 2006/0169138 A1 * | 8/2006 | Schmidt | 95/54 |
| 2006/0278073 A1 * | 12/2006 | McHugh | 95/46 |

FOREIGN PATENT DOCUMENTS

| | | |
|---|---|---|
| EP | 0273267 | 7/1988 |
| EP | 0354797 | 2/1990 |
| EP | 0460512 | 12/1991 |
| EP | 0493869 | 7/1992 |
| EP | 0552090 | 7/1993 |
| EP | 0576677 | 1/1994 |
| EP | 0583748 | 2/1994 |
| EP | 0622475 | 11/1994 |
| EP | 0750322 | 12/1996 |
| EP | 0791383 | 8/1997 |
| EP | 0963229 | 8/1998 |
| EP | 09070738 | 1/2000 |
| EP | 1018353 | 7/2000 |
| EP | 1052011 | 11/2000 |
| EP | 1210971 | 6/2002 |
| EP | 1239189 | 9/2002 |
| EP | 1270063 | 1/2003 |
| EP | 1277504 | 1/2003 |
| EP | 01688349 | 8/2006 |
| JP | 63151307 | 6/1988 |
| JP | 3169304 | 7/1991 |
| JP | 3193106 | 8/1991 |
| JP | 5084474 | 4/1993 |
| JP | 5317605 | 12/1993 |
| JP | 7080205 | 3/1995 |
| JP | 7227504 | 8/1995 |
| JP | 8000906 | 1/1996 |
| JP | 8332306 | 12/1996 |
| JP | 10174803 | 6/1998 |
| JP | 10216404 | 8/1998 |
| JP | 11009902 | 1/1999 |
| JP | 11033373 | 2/1999 |
| JP | 11244607 | 9/1999 |
| JP | 2000051606 | 2/2000 |
| JP | 2000084368 | 3/2000 |
| JP | 20000140505 | 5/2000 |
| JP | 20000262871 | 9/2000 |
| JP | 2000288366 | 10/2000 |
| JP | 2000350902 | 12/2000 |
| JP | 2003010604 | 1/2003 |
| JP | 2003062403 | 3/2003 |
| JP | 2003200024 | 7/2003 |
| JP | 2003245525 | 9/2003 |
| WO | WO 94/16800 | 8/1994 |
| WO | WO 97/02190 | 1/1997 |
| WO | WO 99/39811 | 8/1999 |
| WO | WO 00/44479 | 8/2000 |
| WO | WO 00/44482 | 8/2000 |
| WO | WO 03/029744 | 4/2003 |
| WO | WO 03/036747 | 5/2003 |
| WO | WO 03/080228 | 10/2003 |
| WO | WO 03/086573 | 10/2003 |
| WO | WO 2004/007060 | 1/2004 |
| WO | WO 2004/041397 | 5/2004 |
| WO | 2005/025718 | 3/2005 |

OTHER PUBLICATIONS

U.S. Appl. No. 11/334,126, entitled "A Method for Enhancing Mass Transport in Fuel Deoxygenation Systems", filed Jan. 18, 2006.

U.S. Appl. No. 11/334,590, entitled "Fuel Deoxygenation System With Non-Metallic Fuel Plate Assembly", filed Jan. 18, 2006.

U.S. Appl. No. 11/148,508, entitled Fuel Deoxygenation System With Non-Planar Plate Members, filed Jun. 9, 2005.

U.S. Appl. No. 11/049,175, entitled "Fuel Deoxygenation System With Textured Oxygen Permeable Membrane," filed Feb. 2, 2005.

U.S. Appl. No. 11/265,845 entitled "Fuel Deoxygenation System With Multi-Layer Oxygen Permeable Membrane," filed Nov. 3, 2005.

Richard W. Baker, "Membrane Technology and Applications," 2nd Edition, John Wiley & Sons, Ltd., pp. 96-103.

* cited by examiner

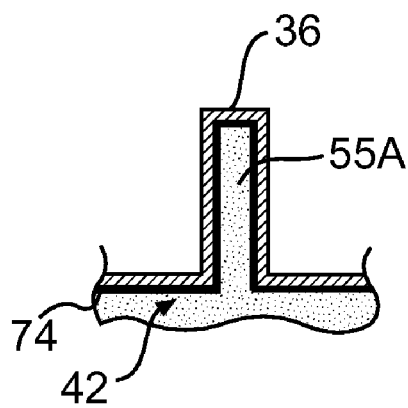
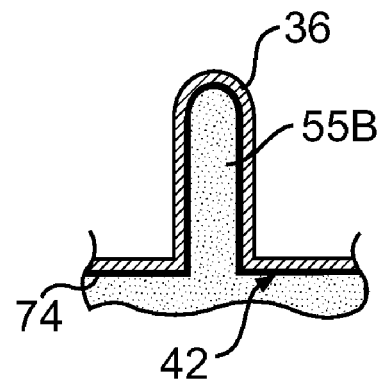
FIG. 4A     FIG. 4B
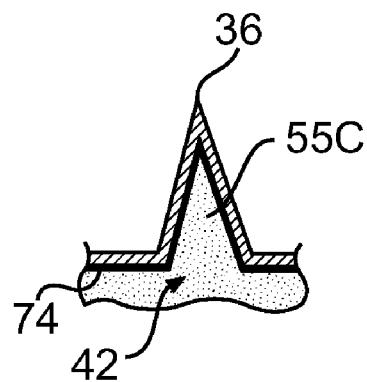
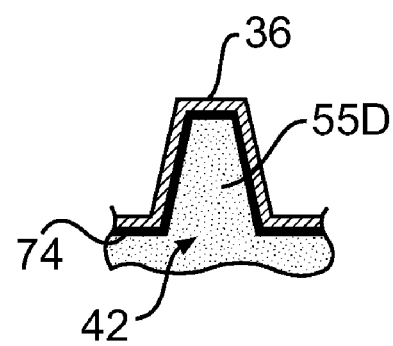
FIG. 4C     FIG. 4D

FUEL DEOXYGENATOR WITH NON-PLANAR FUEL CHANNEL AND OXYGEN PERMEABLE MEMBRANE

BACKGROUND OF THE INVENTION

The present invention relates to degasification of liquids, and more particularly, to removal of gas from a liquid through a flow perturbation element within a fluid channel.

Liquid fuel is often utilized in vehicles, such as aircraft, as a coolant for various systems. The presence of dissolved oxygen in hydrocarbon liquid fuels may be objectionable because the oxygen supports oxidation reactions that yield undesirable by-products. Dissolution of air in liquid fuel results in an approximately 70 ppm oxygen concentration at equilibrium saturation conditions. When aerated fuel is heated between approximately 300° F. and 850° F. the dissolved oxygen initiates free radical reactions of the fuel resulting in deposits commonly referred to as "coke" or "coking." Coke may be detrimental to the fuel lines and may inhibit combustion. The formation of such deposits may impair the normal functioning of a fuel system, either with respect to an intended heat exchange function or the efficient injection of fuel.

One example Fuel Stabilization Unit (FSU) available for use in aircraft to remove oxygen from the liquid fuel includes a planar fuel channel that receives oxygen-saturated fuel. The fuel channel is lined with an oxygen permeable membrane to remove oxygen from the liquid fuel. An oxygen pressure gradient across the oxygen permeable membrane draws the oxygen from the liquid fuel to produce oxygen-depleted liquid fuel. Although effective, it is desirable to further reduce the size and weight of the FSU while achieving similar or improved oxygen removal.

Accordingly, it is desirable to provide a compact and lightweight fuel system for degassing liquids, such as liquid fuel.

SUMMARY OF THE INVENTION

One embodiment fuel system according to the present invention includes a flow perturbation element within a fuel channel. The flow perturbation element includes a shaped gas permeable surface for removing dissolved gas from passing fuel efficiently. A gas permeable membrane is coated on the gas permeable surface and allows the dissolved gas to be transported out of passing fuel into a gas-removal channel. The gas permeable surfaces on the flow perturbation elements provide "active" surface, which allows the fuel channel to be both compact and efficient.

One embodiment fuel system according to the present invention includes a fuel passage that defines an axis. A first gas permeable membrane includes a first distal section and a first proximal section that is relatively nearer to the axis than the first distal section. A second flow perturbation element includes a second gas-removal channel in communication with a second gas permeable membrane. The second gas permeable membrane includes a second distal section and a second proximal section that is relatively nearer to the axis than the second distal section.

One embodiment fuel system includes a fuel channel for receiving fuel having dissolved gas therein. A porous flow perturbation element defines a non-planar flow passage through the fuel channel. A gas permeable membrane is in communication with the fuel channel. A gas-removal channel adjacent the porous flow perturbation element receives the dissolved gas from the fuel through the gas permeable membrane and porous flow perturbation element.

One embodiment fuel system according to the present invention includes a fuel channel having a flow passage between elongated channel walls for receiving fuel having dissolved gas therein. A porous flow perturbation element extends from one of the elongated channel walls into the flow passage. A gas permeable membrane is in communication with the fuel channel. A gas-removal channel adjacent the porous flow perturbation element receives the dissolved gas from the fuel through the gas permeable membrane and porous flow perturbation element.

One embodiment method includes coating a gas permeable membrane adjacent a non-planar fuel channel substrate to produce a non-planar fuel channel flow perturbation element.

The above examples are not intended to be limiting. Additional examples are described below.

BRIEF DESCRIPTION OF THE DRAWINGS

The various features and advantages of this invention will become apparent to those skilled in the art from the following detailed description. The drawings that accompany the detailed description can be briefly described as follows:

FIG. 4A is an embodiment of a rectangular flow perturbation element;

FIG. 4B is an embodiment of a rounded rectangular flow perturbation element;

FIG. 4C is an embodiment of a triangular flow perturbation element;

FIG. 4D is an embodiment of a polygonal flow perturbation element;

DETAILED DESCRIPTION OF THE PREFERRED EMBODIMENT

Figure 1:
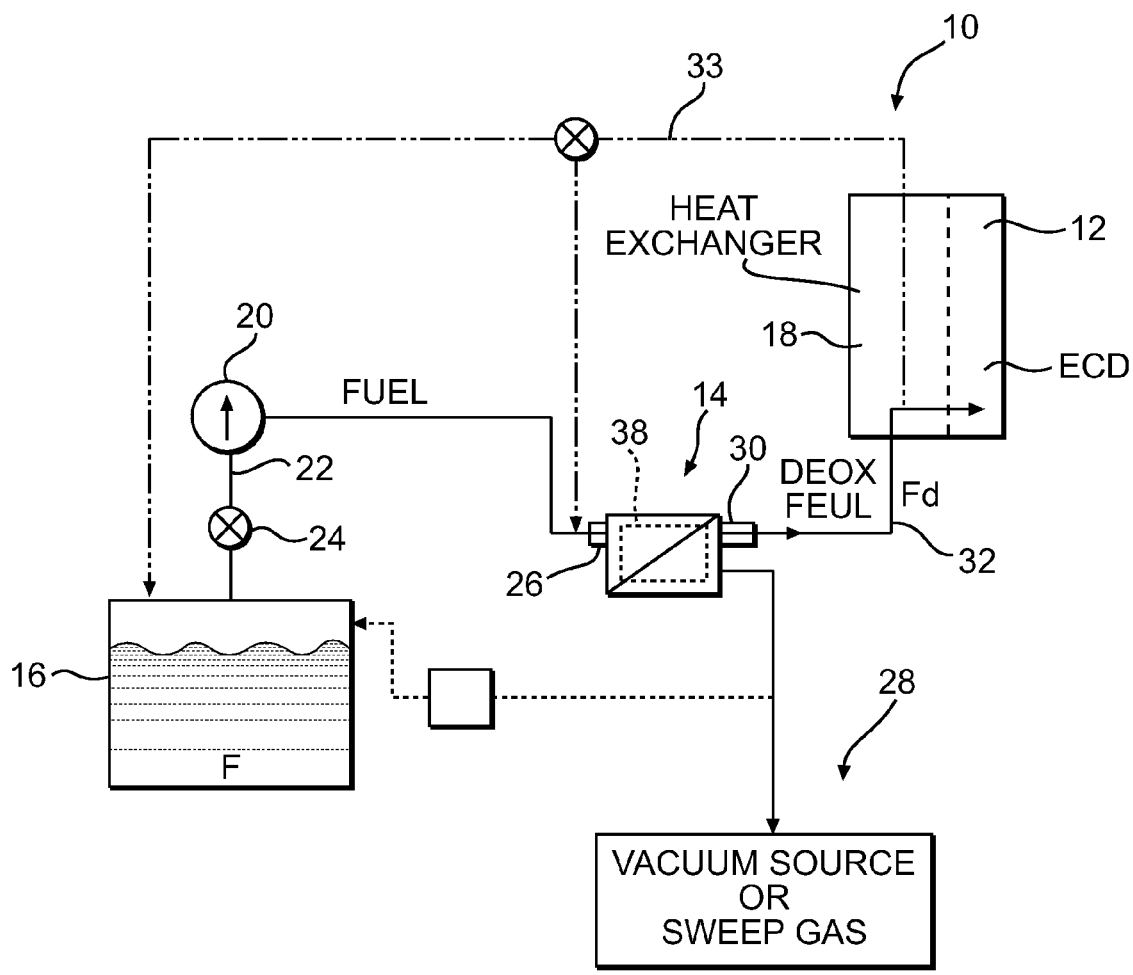
FIG. 1 is a general schematic diagram of an energy conversion device (ECD) and an associated fuel system.

FIG. 1 illustrates a general schematic view of a fuel system 10 for an energy conversion device (ECD) 12, which demonstrates one example use of a deoxygenator system 14 and is not intended to be limiting. The deoxygenator system 14 receives liquid fuel F from a reservoir 16 such as a fuel tank. The fuel F is typically a liquid hydrocarbon such as jet fuel. The ECD 12 may exist in a variety of forms in which the fuel, at some point prior to eventual use for processing, for combustion, or for some form of energy release, acquires sufficient heat to support autoxidation reactions and coking if dissolved oxygen is present to any significant extent in the fuel.

One form of the ECD 12 is a gas turbine engine, such as in aircraft. Typically, the fuel also serves as a coolant for one or more sub-systems in the aircraft and becomes heated as it is delivered to fuel injectors immediately prior to combustion.

A heat exchange section 18 represents a system through which the fuel passes in a heat exchange relationship. It should be understood that the heat exchange section 18 may be directly associated with the ECD 12 and/or distributed elsewhere in the larger system 10. The heat exchange system 18 may alternatively or additionally include a multiple of heat exchangers distributed throughout the system.

As generally understood, fuel F stored in the reservoir 16 normally contains dissolved oxygen, possibly at a saturation level of 70 ppm. A fuel pump 20 draws the fuel F from the reservoir 16. The fuel pump 20 communicates with the reservoir 16 via a fuel reservoir conduit 22 and a valve 24 to a fuel inlet 26 of the deoxygenator system 14. The pressure applied by the fuel pump 20 assists in circulating the fuel F through the deoxygenator system 14 and other portions of the fuel system 10. As the fuel F passes through the deoxygenator system 14, oxygen is selectively removed into a vacuum or sweep gas system 28. The sweep gas S can be any gas that is essentially free of oxygen.

The deoxygenated fuel Fd flows from a fuel outlet 30 of the deoxygenation system 14 via a deoxygenated fuel conduit 32, to the heat exchange system 18 and to the ECD 12. A portion of the deoxygenated fuel may be recirculated, as represented by recirculation conduit 33 to either the deoxygenation system 14 and/or the reservoir 16. It should be understood that although a particular component arrangement is disclosed in the illustrated embodiment, other arrangements will benefit from the invention.

Figure 2A:
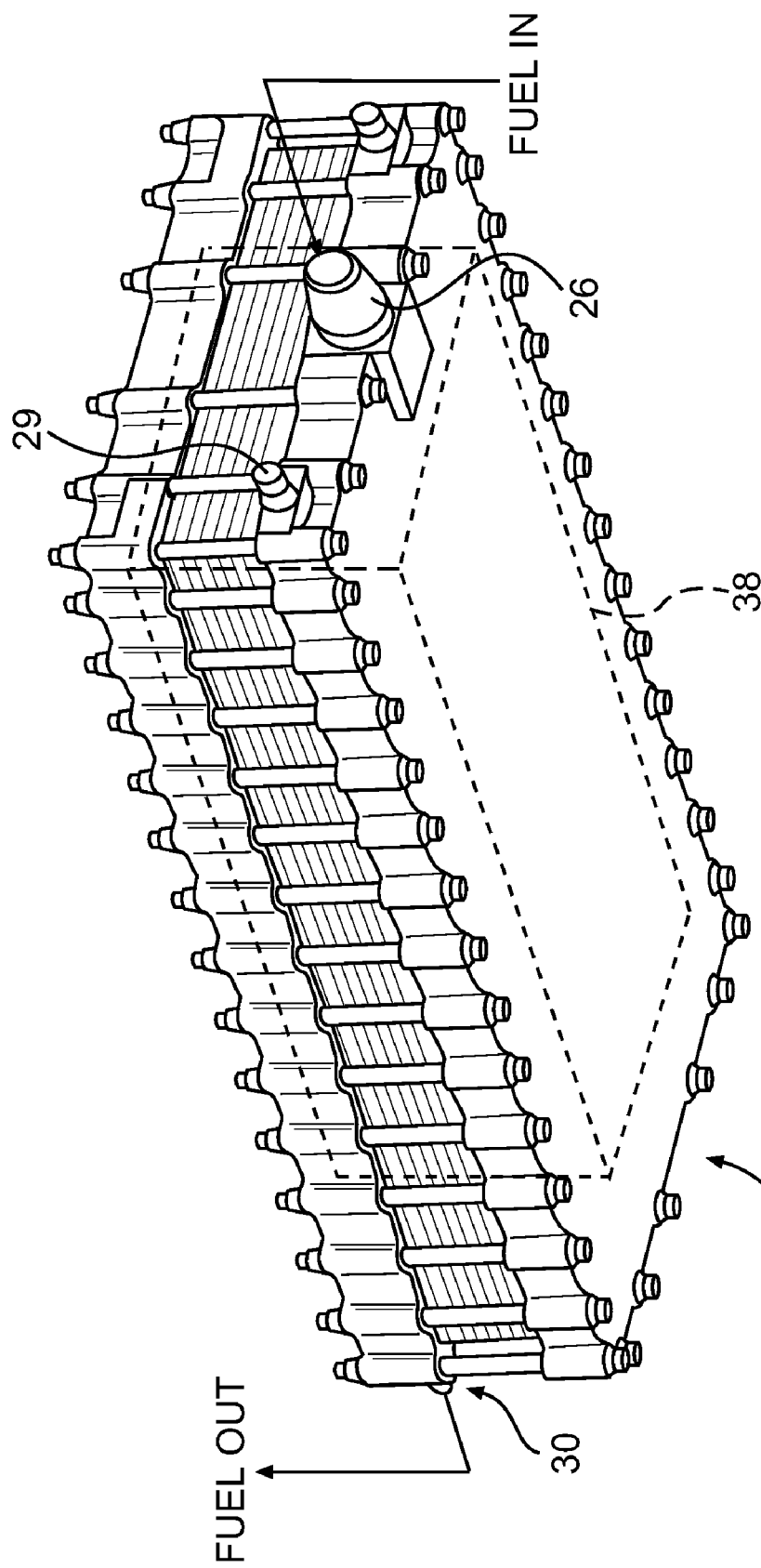
FIG. 2A is an embodiment of a fuel deoxygenator system utilized in the fuel system of FIG. 1.
Figure 2B:
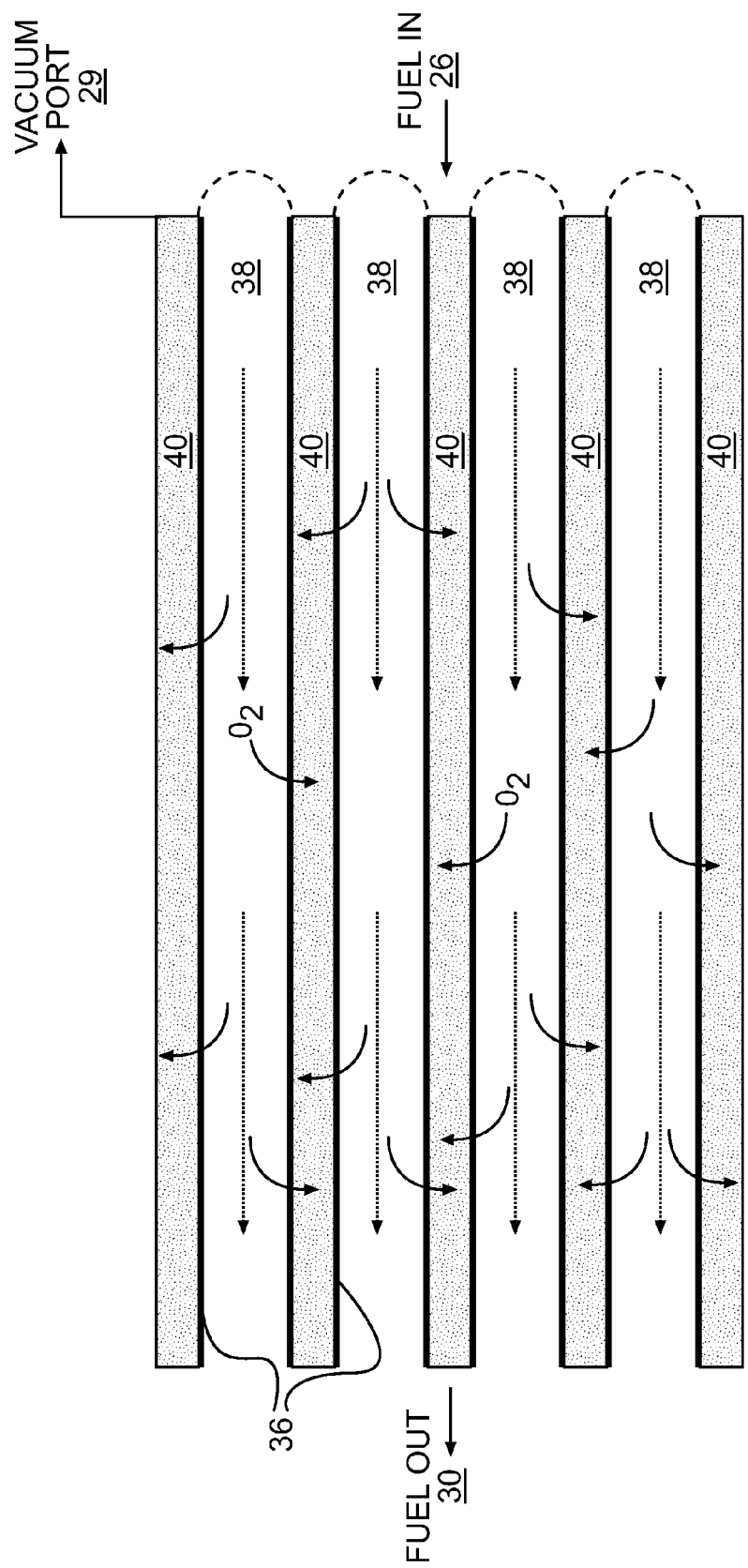
FIG. 2B is a simplified cross-sectional view illustrating the operation of the example fuel deoxygenator system of FIG. 2A.

Referring to FIGS. 2A and 2B, a simplified deoxygenator system 14 is shown schematically to illustrate the basic operation. The deoxygenator system 14 includes one or more fuel channels 38 that include oxygen permeable membranes 36 and gas-removal channels 40. The fuel channels 38 are fluidly connected between the fuel inlet 26 and the fuel outlet 30. It should be understood that the channels 38 may be of various shapes and arrangements different from the simplified arrangement shown.

The oxygen permeable membrane 36 allows dissolved oxygen (and other gases) to diffuse through angstrom-size openings, such as voids or pores, but excludes the larger fuel molecules. Alternatively, or in conjunction with the angstrom-size openings, the oxygen permeable membrane 36 utilizes a solution-diffusion mechanism to dissolve and diffuse oxygen through the membrane, while excluding the fuel.

The family of Teflon AF, which is an amorphous copolymer of perfluoro-2,2-dimethyl-1,3-dioxole (PDD) often identified under the trademark "Teflon AF" registered to E. I. DuPont de Nemours of Wilmington, Del., and the family of Hyflon AD, which is a copolymer of 2,2,4-trifluoro-5-trifluoromethoxy-1,3-dioxole (TTD) registered to Solvay Solexis, Milan, Italy have proven to provide effective results as oxygen permeable membranes for fuel deoxygenation. The Teflon AF 2400 and/or Teflon AF 1600 material is believed to use a solution-diffusion mechanism. Given this description, one of ordinary skill in the art will recognize other types of fluoropolymers or other polymer materials to meet their particular needs as an oxygen permeable membrane.

The inlet 26 of the fuel deoxygenator system 14 receives oxygen-rich fuel and an outlet 30 discharges oxygen-depleted fuel. A vacuum port 29 is in communication with the fuel channel 38 for creating an oxygen partial pressure gradient within the fuel channel 38 through the membrane to extract dissolved oxygen and other dissolved gases.

The specific quantity of fuel channels 38 is determined by application-specific requirements, such as fuel type, fuel temperature, and mass flow demand from the engine. Further, different fuels containing different amounts of dissolved oxygen may require different amounts of deoxygenation to remove a desired amount of dissolved oxygen.

Figure 3A:
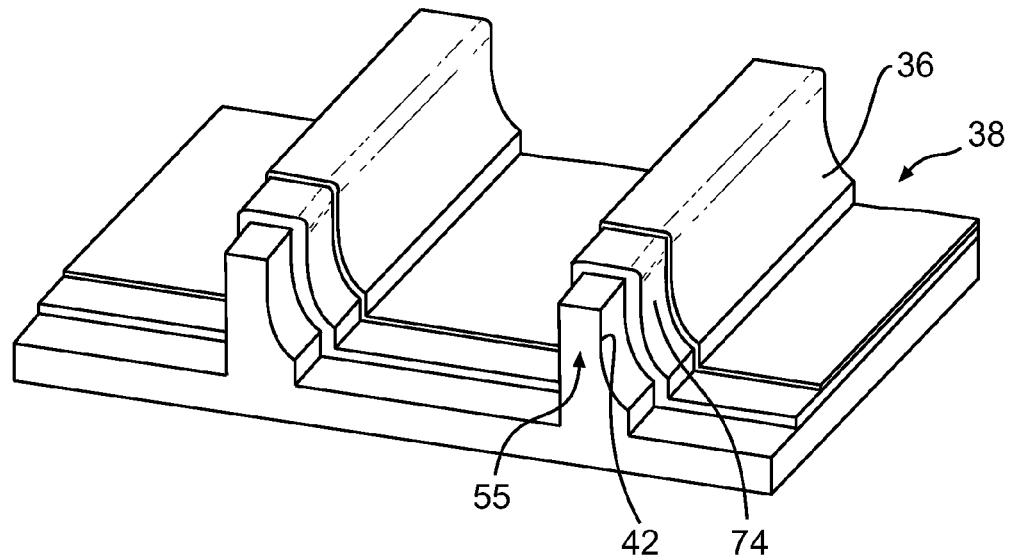
FIG. 3A is a perspective view of an embodiment of a flow perturbation element.
Figure 3B:
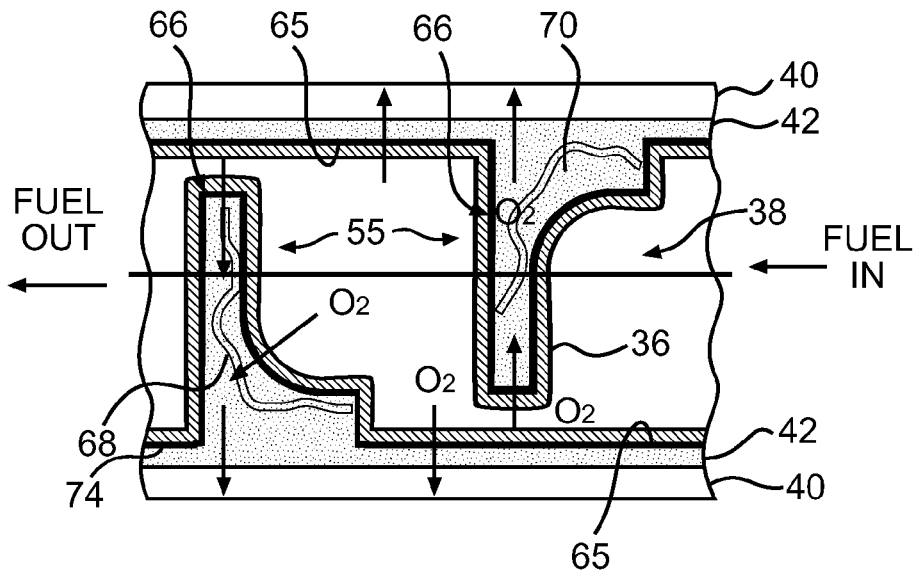
FIG. 3B is a cross-sectional view of the flow perturbation element of FIG. 3A.
Figure 3C:
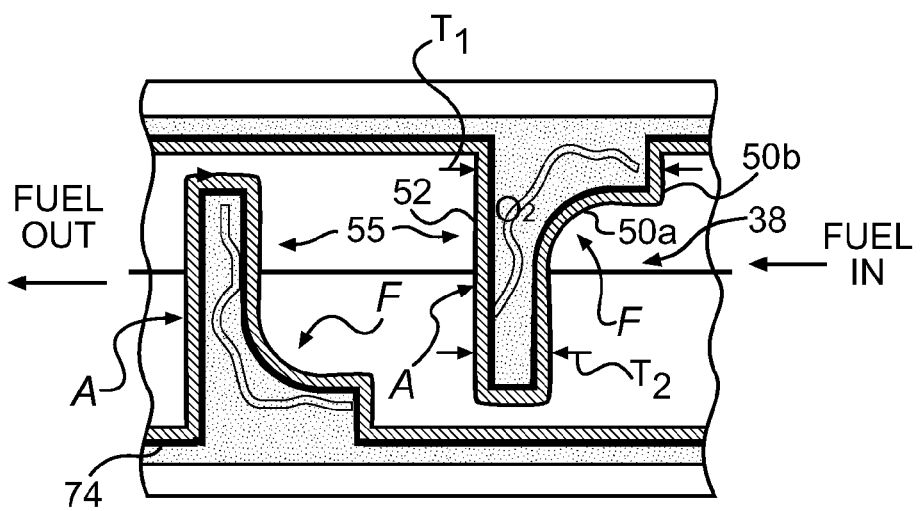
FIG. 3C shows the flow perturbation element of FIG. 3A, illustrating a forward and aft surface.

Referring to FIGS. 3A, 3B, and 3C, each fuel channel 38 includes flow perturbation elements 55. The flow perturbation elements 55 include a porous support 42 that defines fuel channel walls 65 and the profile of the flow perturbation elements 55.

A backing layer 74, such as porous polyetherimide or other porous material, can be located between the porous support 42 and the oxygen permeable membrane 36. In one example, the backing layer 74 is about 2 mil thick, however, the thickness can be varied depending on the needs of the particular design.

The backing layer 74 can be deposited onto the porous support 42 using a known phase inversion method. In a further example, the backing layer 74 can be deposited using a phase inversion technique disclosed by R. W. Baker, "Membrane Technology and Applications", Second Edition, John Wiley & Sons, Ltd., p. 96-103.

The flow perturbation elements 55 include gas permeable surfaces 66 through which oxygen is drawn (i.e., "active" surfaces). Pores 70 (shown schematically) of the porous support 42 form a gas permeation passage 68 (i.e. pore 70 network) with the angstrom-size openings of the oxygen permeable membrane 36 and porous backing layer 74 to fluidly connect the fuel channel 38 and the gas-removal channel 40. The backing layer 74 provides a bridge for oxygen transport between the oxygen permeable membrane 36 and the porous support 42. In other words, the porosity of the backing layer 74 provides passages for oxygen to move from the oxygen permeable membrane 36 to the porous support 42. The reason why the backing layer 74 may be needed is that for resistance reduction purposes, the pore size in the porous support 42 sometimes is too big for the oxygen permeable membrane 36 to be coated on directly. If the pore size is fine enough while flow resistance is still at a desired level, the oxygen permeable membrane 36 can be coated on directly on to the porous support 42 without the backing layer 74. The oxygen permeable membrane 36 is coated on the gas permeable surfaces 66 to prevent fuel from passing into the passages 68 and allow dissolved oxygen to be transported from the fuel channel 38 into the gas permeation passages 68 and then into the gas-removal channel 40.

Fuel flowing through the fuel channel 38 is in contact with the oxygen permeable membrane 36. Vacuum via the vacuum port 29 creates an oxygen partial pressure differential (i.e., an oxygen concentration differential) across the oxygen permeable membrane 36 which causes transfer of oxygen dissolved within the fuel through the oxygen permeable membrane 36, porous backing layer 74, and porous support 42, and out of the deoxygenator system 14 through the gas-removal channel 40. Alternatively, the same oxygen partial pressure differential can be created by sweep gas which constantly removes the oxygen in the gas-removal channel 40.

The porous support 42 is fabricated in a known manner by molding, casting, sintering, or other method from a porous polymer, metal foam, porous ceramic, ceramic foam, or polymer foam for example. One example polymer foam includes open cell polyurethane. In a further example, the porous support 42 is resistant to liquid fuel so as not to significantly degrade and has a relatively high porosity to provide uniform vacuum distribution and enable efficient oxygen removal without significant oxygen partial pressure build-up. In some examples, the porous support 42 and the gas-removal channel 40 can be combined as one part.

In the illustrated example, the flow elements 55 are integrated to provide the fuel channel 38 with intricate multi-dimensional flow characteristics. In other words, the flow perturbation elements 55 extend into the flow of fuel through the fuel channel 38 (FIG. 2B). Given this description, one of ordinary skill in the art will recognize alternate arrangements of flow perturbation elements 55 to meet their particular needs.

Utilizing gas permeable surfaces 66 on the flow perturbation elements 55 in combination with the oxygen permeable membrane 36 and the backing layer 74 provides the benefit of greater oxygen removal efficiency compared to conventional planar fuel channels without "active" flow perturbation elements 55. Therefore, the fuel deoxygenator system 14 can be made more compact for the same performance or be made to remove more oxygen with the same size.

In one example, the configuration of the fuel channel 38 is designed to maximize oxygen exposure to the oxygen permeable membrane 36 to increase the amount of dissolved oxygen removed from the fuel. In one example, this is accomplished by increasing the surface area of the oxygen permeable membrane 36. In another example, this is accomplished by exposing active oxygen permeable membrane 36 area to the flow region where oxygen concentration is relatively high. In a further example, this is accomplished by providing mixing and/or optimal fuel flow patterns through the fuel channel 38. In one example, the fuel channels 38 are small enough to provide desired oxygen contact with the oxygen permeable membrane 36 and large enough so as not to undesirably restrict fuel flow.

The flow perturbation elements 55 enhance deoxygenation by increasing the efficiency due to higher surface-to-volume ratio and by perturbing the flow near the membrane 36 surface, thus enhancing oxygen transport from the bulk of the fuel directly to the surface of the membrane. The flow perturbation elements 55 of the deoxygenator system 14 therefore enhance contact between oxygen and the oxygen permeable membrane 36 to increase mass transport of dissolved oxygen.

Each flow perturbation element 55 defines a forward surface F and an aft surface A. The forward surface F faces a direction approximately opposite to the fuel flow direction and the aft surface A faces in a direction with the fuel flow direction.

In the illustrated example, the forward surface F includes a curved section 50a and a planar section 50b, and the aft surface A includes a planar section 52. The planar section 50b and planar section 52 define a first flow perturbation element thickness $T_1$, and the curved section 50a and the planar section 52 define a second flow perturbation element thickness $T_2$. In this example, the thickness $T_1$ is greater than the thickness $T_2$. Utilizing a flow perturbation element 55 having a relatively thicker base facilitates ejection from a mold during manufacturing of the porous support 42 (e.g., injection molding).

FIGS. 4A-4D illustrate portions of flow perturbation elements 55a, 55b, 55c, 55d having various cross-sectional profiles for directing passing fuel such as rectangular (FIG. 4A), rounded rectangular (FIG. 4B), triangular (FIG. 4C), and polygonal (FIG. 5D). In further examples, the corners of the flow perturbation elements 55a, 55b, 55c, and 55d are rounded to provide a smooth oxygen permeable membrane 36 transition over the corners. A flow channel does not have to have the same type or size of the flow perturbation elements 55a, 55b, 55c, and 55d. Given this description, one of ordinary skill in the art will recognize that different types and sizes of the flow perturbation elements 55a, 55b, 55c, and 55d and different flow gap sizes can be used to adjust the performance. Given this description, one of ordinary skill in the art will recognize other suitable profiles for flow perturbation elements 55.

Figure 5:
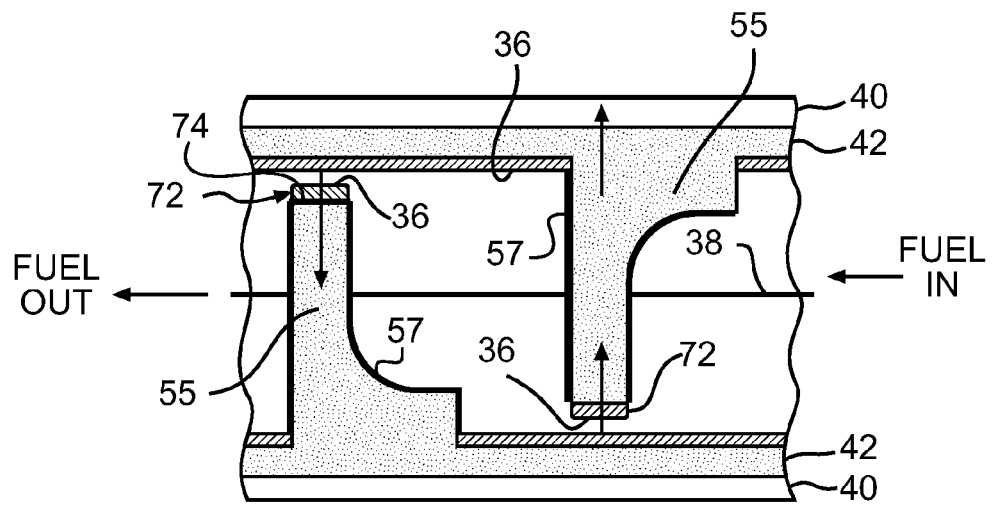
FIG. 5 is an embodiment having the oxygen permeable membrane on a selected section of the flow perturbation element.

As shown in the embodiment of FIG. 5, the oxygen permeable membrane 36 is selectively coated only on a portion of the flow perturbation elements 55, such as a top section 72. This allows oxygen removal through selected surfaces of the flow perturbation element 55, such as surfaces that receive relatively greater fuel flow flux, to increase mass transport of dissolved oxygen. Other surfaces that are less advantageously located for fuel perturbation and mass transport of dissolved oxygen do not include the oxygen permeable membrane 36 but include a seal surface 57 to prevent fuel from infiltrating the porous support 42 and gas-removal channel 40.

Figure 6:
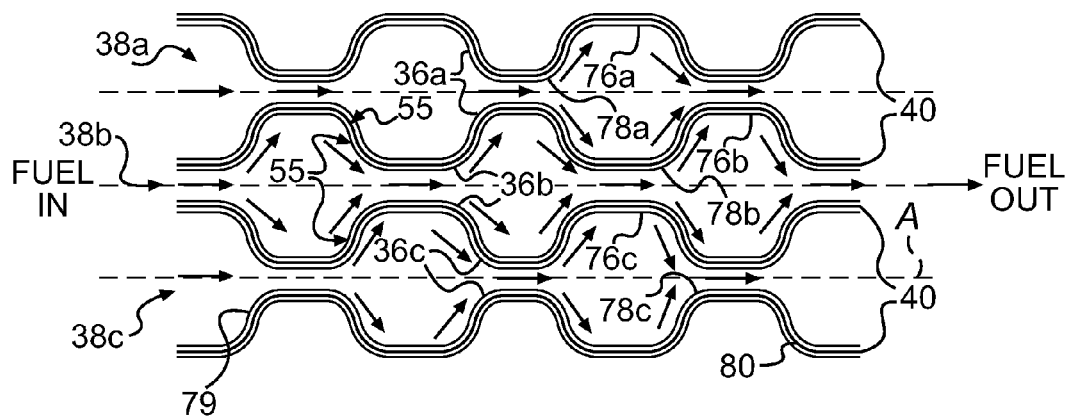
FIG. 6 is an embodiment of a symmetric fuel channel arrangement, illustrating fuel channel trough sections and peak sections.

FIG. 6 shows a cross-sectional view of another embodiment having fuel channels 38a, 38b, and 38c. Each of the fuel channels 38a, 38b, and 38c defines a central axis A and includes flow perturbation elements 55 that define the respective fuel channel 38a, 38b, and 38c. The flow perturbation elements 55 of the fuel channels 38a, 38b, and 38c include respective oxygen permeable membranes 36a, 36b, and 36c in communication with gas-removal channels 40 to remove dissolved oxygen from passing liquid fuel similarly to as described above.

The flow perturbation elements 55 in the illustrated example define troughs sections 76a, 76b, and 76c and peak sections 78a, 78b, and 78c in the respective fuel channels 38a, 38b, and 38c. The trough sections 76a, 76b, and 76c are located farther from the respective central axes A than the peak sections 78a, 78b, and 78c.

In the illustrated embodiment, the trough sections 76a of fuel channel 38a correspond to the peak sections 78b of fuel channel 38b. That is, the trough sections 76a are aligned along an axial direction along the axes A with the peak sections 78b. The trough sections 76b of fuel channel 38b correspond to the peak sections 78c of fuel channel 38c. In other words, each fuel channel 38a, 38b, and 38c is symmetric relative to a plane along its respective axis A.

The flow perturbation elements 55 include corners 79 to provide a smooth transition between the trough sections 76a, 76b, 76c and the peak sections 78a, 78b, and 78c. This provides the benefit of eliminating relatively sharp bends in the oxygen permeable membranes 36a, 36b, and 36c. In one example, the corners 79 are rounded to a radius of curvature such as about 0.015 inches.

Figure 7:
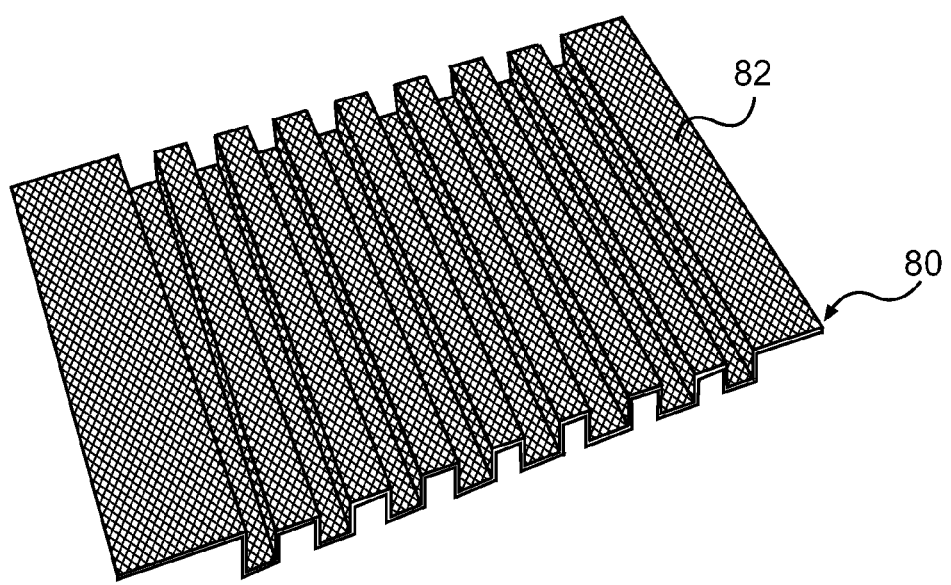
FIG. 7 is an embodiment of a mesh support structure.

In the illustrated embodiment, structural members 80 support the oxygen permeable membranes 36a, 36b, and 36c and define the gas-removal channels 40. In one example shown in FIG. 7, the structural member 80 includes a corrugated wire mesh 82 which allows gas to flow within. In one example, a woven mesh is used which allows gas to flow within.

Optionally, the backing layer 74 (FIG. 3A) is located between each structural member 80 and the oxygen permeable membranes 36a, 36b, and 36c as described above.

Figure 8:
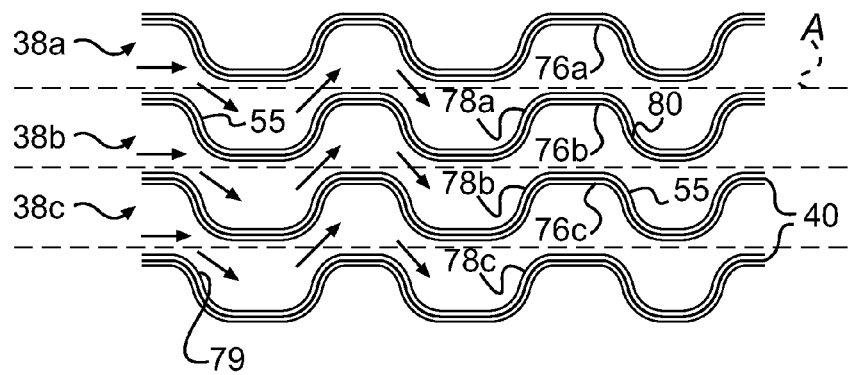
FIG. 8 is an embodiment of a stacked fuel channel arrangement.

FIG. 8 shows an embodiment similar to that shown in FIG. 6, but the trough sections 76a correspond to trough sections 76b, and the trough sections 76b correspond to the trough sections 76c. That is, the trough sections 76a, 76b, and 76c are aligned along an axial direction along the axes A. Likewise, the peak sections 78a correspond to peak sections 78b, and the peak sections 78b correspond to the peak sections 78c. In other words, the fuel channels 38a, 38b, and 38c are in a stacked arrangement.

Figure 9:
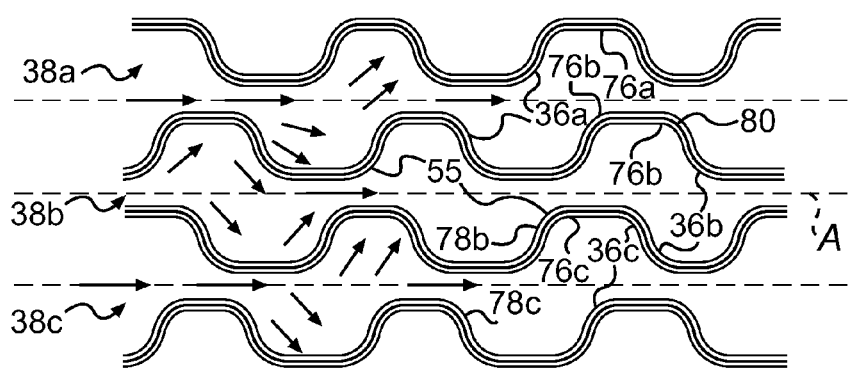
FIG. 9 is an embodiment of an offset fuel channel arrangement.

FIG. 9 shows an embodiment similar to that shown in FIGS. 6 and 8, but the trough sections 76a are partially offset from the trough sections 76b, and the trough sections 76b are partially offset from the trough sections 76c. Likewise, the peak sections 78a are partially offset from the peak sections 78b, and the peak sections 78b are partially offset from the peak sections 78c.

In the above examples, the oxygen permeable membrane 36 is coated adjacent the backing layer 74, the support structure 80, or other substrate. In one example of making the oxygen permeable membrane, the oxygen permeable membrane 36 is prefabricated with or without the backing layer 74 in flat or pre-shaped form and then formed to a shape of the support structure 80, or other substrate. In another example, the oxygen permeable membrane 36 is coated in situ adjacent the backing layer 74, support structure 80, or other substrate. If the pore size in support structure 80 is fine enough while flow resistance is still at proper level, the oxygen permeable membrane 36 can be coated on directly on to the porous support 42 without the backing layer 74. A flow channel does not have to have the same type or size of the flow perturbation elements 55. Given this description, one of ordinary skill in the art will recognize that different types and sizes of the flow perturbation elements 55 can be used to adjust the performance.

The oxygen permeable membrane is formed, for example, by spray coating, electro-spray coating (e.g., wherein electrical field is used to direct the spray to desired areas), brush coating, solution cast coating, vapor deposition coating, plasma coating, or solventless vapor coating. These methods are applicable to forming the gas permeable membrane 36 by prefabrication and are thought to be applicable to in situ formation of the gas permeable membrane 36.

In one prefabrication example, the oxygen permeable membrane 36 is prefabricated in a known manner and shape-formed onto the support structure 80 which allows gas to flow within, or other substrate. A vacuum or pressure is used to conform the prefabricated oxygen permeable membrane 36 with or without the backing layer 74 to the non-planar shape of the support structure 80, or other substrate. Optionally, heat is used to form the oxygen permeable membrane 36 to the non-planar shape of the support structure 80, or other substrate. In a further example, the backing layer 74 (FIG. 3A) is placed adjacent the support structure 80, or other substrate before shape-forming the oxygen permeable membrane.

In one example of in situ formation, the oxygen permeable membrane 36 is formed adjacent the backing layer 74, support structure 80, or other substrate. This eliminates additional steps associated with conforming the oxygen permeable membrane 36 with the shape of the support structure 80, or other substrate.

One example in situ coating method includes solventless vapor coating. In solventless vapor coating, a desired amount of precursor materials, such as monomers for the formation of amorphous fluoropolymer, is vaporized. The vaporized monomers are deposited onto the flow perturbation element 55 to form a green coating. The term "green" refers generally to a coating that is not fully developed. Here the green coating is not yet fully developed because the monomers have not yet been polymerized.

The porous support 42 and green coating are then heated at a selected temperature in an inert atmosphere to polymerize the green coating and thereby form the oxygen permeable membrane 36. The selected temperature depends on the selected type of polymer, and is generally known for polytetrafluoroethylene. The disclosed vapor deposition process provides a uniform thin membrane on the non-planar shape of the porous support 42 as in FIG. 3B etc. or on the support structure 80 as in FIG. 6 etc. with or without the backing layer 74. In one example, a solventless vapor coating device is thought to provide a uniform thin membrane having a thickness between about 100 nm and 2 μm on the non-planar shape.

Alternatively, a plasma coating method is utilized to coat the oxygen permeable membrane 36 on a non-planar surface. Plasma coating includes introducing precursor materials, such as monomers, into a plasma generator. A plasma generated in the plasma generator bombards the monomers with electrons. Impact between the electrons and monomers fragments thereby activates the monomers. The activated fragments are coated onto the non-planar shape and polymerize to form the oxygen permeable membrane 36. Similar to the vapor deposition process, plasma coating is thought to provide a uniform thin membrane having a thickness between about 100 nm and 2 μm on the non-planar shape.

Alternatively to vapor or plasma coating, solution casting has been used to form planar membranes and is thought to be applicable to fabricating the oxygen permeable membrane 36 on a non-planar surface. In one example of solution casting, precursor materials are mixed in solution with a solvent. The permeable surfaces 66 (FIG. 3B) of the porous support 42 are dipped into the solution. The solution and porous support 42 are then heated to remove solution solvent and polymerize the precursor materials to form the oxygen permeable membrane 36. Optionally, the support backing layer 74 shown in FIG. 6 is deposited onto the porous support 42 before the solution casting process to serve as a template for formation of the oxygen permeable membrane 36.

In another example, coating of the oxygen permeable membrane 36 is accomplished by chemical vapor deposition (CVD) as described by Sharangpani and Singh (Rev. Sci. Instrum. 68 (3), March 1997). In a further example, coating of the oxygen permeable membrane 36 is accomplished by laser ablation as described by Blanchet (Appl. Phys. Lett. 62 (5), 1 Feb. 1993).

The foregoing description is exemplary rather than defined by the limitations within. Many modifications and variations of the present invention are possible in light of the above teachings. One of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

We claim:

1. A device for use in a fluid system, comprising:
   a fluid channel extending between side walls for receiving fluid having dissolved gas; and
   a flow perturbation element extending from one of the side walls into the fluid channel, the flow perturbation element having a gas permeable surface through which at least a portion of the dissolved gas will pass.

2. The device as recited in claim 1, wherein the flow perturbation element defines a gas permeation passage that extends through the flow perturbation element.

3. The device as recited in claim 1, wherein the gas permeable surface includes a gas permeable membrane.

4. The device as recited in claim 3, including a backing layer between the gas permeable membrane and the gas permeable surface.

5. The device as recited in claim 1, wherein the flow perturbation element comprises a porous material.

6. The device as recited in claim 5, wherein the porous material is a material selected from a group consisting of a porous polymer, a metal foam, porous ceramic, ceramic foam, and a plastic foam.

7. The device as recited in claim 6, wherein the porous material includes pores that define a gas permeation passage through the porous material.

8. The device as recited in claim 1, wherein the flow perturbation element includes a planar surface transverse to a fluid flow direction through the fluid channel and a curved surface adjacent the planar surface.

9. The device as recited in claim 1, wherein the fluid channel comprises a fluid passage between elongated channel walls, and the flow perturbation element extends transversely from one of the elongated channel walls into the fluid passage.

10. A device for use in a fluid system, comprising:
a fuel passage defining an axis and extending between side walls;
a first flow perturbation element extending from one of the side walls into the fuel passage and comprising a first gas-removal channel in communication with a first gas permeable membrane having a first distal section and a first proximal section that is relatively nearer to the axis than the first distal section; and
a second flow perturbation element extending from one of the side walls into the fuel passage and comprising a second gas-removal channel in communication with a second gas permeable membrane having a second distal section and a second proximal section that is relatively nearer to the axis than the second distal section.

11. The device as recited in claim 10, wherein the first proximal section and the first distal section are respectively aligned in an axial direction relative to the axis with the second proximal section and the second distal section.

12. The device as recited in claim 10, wherein the first proximal section and the first distal section are respectively aligned in an axial direction relative to the axis with the second distal section and the second proximal section.

13. The device as recited in claim 10, wherein the first proximal section and the first distal section are respectively offset in an axial direction relative to the axis from the second distal section and the second proximal section.

14. A device for use in a fluid system, comprising:
a fuel passage defining an axis;
a first flow perturbation element comprising a first gas-removal channel in communication with a first gas permeable membrane having a first distal section and a first proximal section that is relatively nearer to the axis than the first distal section; and
a second flow perturbation element comprising a second gas-removal channel in communication with a second gas permeable membrane having a second distal section and a second proximal section that is relatively nearer to the axis than the second distal section, and the first gas permeable membrane and the second gas permeable membrane faces in a direction toward the fuel passage, and each of the first flow perturbation element and the second flow perturbation element comprises a third gas permeable membrane that faces in an opposite direction toward an adjacent fuel passage.

15. The device as recited in claim 14, wherein each of the first flow perturbation element and the second flow perturbation element comprises a mesh structural member that defines a gas-removal channel between the third gas permeable membrane and the respective first gas permeable membrane and second gas permeable membrane.

16. The device as recited in claim 15, wherein the gas-removal channel is operable to provide a concentration differential between the fuel passage and the gas-removal channel.

17. The device as recited in claim 10, wherein the first distal section, the first proximal section, the second distal section, and the second proximal section extend in a direction transverse to the axis.

18. A device for use in a fluid system, comprising:
a fuel channel for receiving fuel having dissolved gas therein and extending between side walls;
a porous flow perturbation element extending from one of the side walls into the fuel passage and defining a non-planar flow passage through the fuel channel;
a gas permeable membrane in communication with the fuel channel; and
a gas-removal channel adjacent the porous flow perturbation element for receiving the dissolved gas from the fuel through the gas permeable membrane and porous flow perturbation element.

19. The device as recited in claim 18, further comprising a porous backing layer adjacent the gas permeable membrane and the porous flow perturbation element.

20. The device as recited in claim 19, wherein the porous backing layer is between the gas permeable membrane and the porous flow perturbation element.

21. The device as recited in claim 19, wherein the porous backing layer comprises a porous material.

22. The device as recited in claim 21, wherein the porous material comprises polyetheramide.

23. The device as recited in claim 18, wherein the gas-removal channel comprises a gas partial pressure differential relative to the fuel channel to draw dissolved gas from the fuel through the gas permeable membrane and porous flow perturbation element into the gas-removal channel.

24. The device as recited in claim 18, wherein the gas-removal channel comprises a gas concentration differential relative to the fuel channel to draw dissolved gas from the fuel through the gas permeable membrane and porous flow perturbation element into the gas-removal channel.

25. The device as recited in claim 18, further comprising a gas passage that extends through the gas permeable membrane and flow perturbation element to fluidly connect the fuel channel and the gas-removal channel.

26. The device as recited in claim 25, wherein the gas passage comprises a pore network defined by the gas permeable membrane and porous flow perturbation element.

27. The device as recited in claim 18, wherein the porous flow perturbation element is one of a plurality of porous flow perturbation elements that define a non-planar flow passage through the fuel channel.

28. The device as recited in claim 27, wherein the plurality of porous flow perturbation elements are interconnected.

29. A fuel system having a fuel deoxygenator that includes the device as recited in claim 18 for removing the dissolved gas from oxygen-rich fuel to produce oxygen-depleted fuel, and a heat exchanger downstream from the fuel deoxygenator for receiving the oxygen-depleted fuel.

30. The system as recited in claim 29, further including a fuel reservoir in communication with the fuel deoxygenator.

31. The system as recited in claim 30, further including a pump in communication between the fuel reservoir and the fuel deoxygenator.

32. The system as recited in claim 31, further including a return conduit that connects the heat exchanger and the fuel reservoir, and a recirculation conduit that bypasses the fuel reservoir to fluidly connect the heat exchanger and the fuel deoxygenator.

33. The system as recited in claim 32, further including a vacuum source in communication with the gas-removal channel.

34. The system as recited in claim 32, further including a sweep gas source in communication with the gas-removal channel.

35. A device for use in a fluid system, comprising:
   a fuel channel comprising a flow passage between elongated channel walls for receiving fuel having dissolved gas therein;
   a porous flow perturbation element that extends from one of the elongated channel walls into the flow passage;
   a gas permeable membrane in communication with the fuel channel; and
   a gas-removal channel adjacent the porous flow perturbation element for receiving the dissolved gas from the fuel through the gas permeable membrane and porous flow perturbation element.

36. The device as recited in claim 35, wherein the porous flow perturbation element includes a forward surface transverse to the one of the elongated channel walls and an aft surface transverse to the one of the elongated channel walls.

37. A device for use in a fluid system, comprising:
   a fuel channel comprising a flow passage between elongated channel walls for receiving fuel having dissolved gas therein;
   a porous flow perturbation element that extends from one of the elongated channel walls into the flow passage, the porous flow perturbation element including a forward surface transverse to the one of the elongated channel walls and an aft surface transverse to the one of the elongated channel walls, and the forward surface comprises a curved portion and a planar portion adjacent the curved portion;
   a gas permeable membrane in communication with the fuel channel; and
   a gas-removal channel adjacent the porous flow perturbation element for receiving the dissolved gas from the fuel through the gas permeable membrane and porous flow perturbation element.

38. The device as recited in claim 37, wherein the aft surface is planar.

39. The device as recited in claim 37, wherein the curved portion is a radiused surface which blends a base segment of a first thickness with a tip segment of a second thickness, the second thickness less than the first thickness.

40. A device for use in a fluid system, comprising:
   a fuel channel comprising a flow passage between elongated channel walls for receiving fuel having dissolved gas therein;
   a porous flow perturbation element that extends from one of the elongated channel walls into the flow passage, the porous flow perturbation element including a forward surface transverse to the one of the elongated channel walls and an aft surface transverse to the one of the elongated channel walls, and the forward surface includes a stepped surface;
   a gas permeable membrane in communication with the fuel channel; and
   a gas-removal channel adjacent the porous flow perturbation element for receiving the dissolved gas from the fuel through the gas permeable membrane and porous flow perturbation element.

41. A method of removing a gas from a liquid, comprising:
   (a) communicating fluid that includes dissolved gas through a fluid channel that extends between side walls;
   (b) generating a gas concentration differential between the fluid channel and a gas permeation passage within a flow perturbation element extending from one of the side walls into the fluid channel; and
   (c) drawing the gas from the fluid at least partially through the gas permeation passage within the flow perturbation element in the fluid channel.

42. The method as recited in claim 41, including step (c) communicating the gas from the gas permeation passage into a gas-removal channel.

43. The method as recited in claim 41, wherein step (b) includes providing the gas permeation passage through a porous substrate material that defines the flow perturbation element.

44. The device as recited in claim 1, wherein the side walls include gas permeable surfaces.

45. The device as recited in claim 1, wherein the side walls are parallel.

46. The device as recited in claim 1, wherein the flow perturbation element spans partially across the fluid channel.

47. The device as recited in claim 46, wherein the flow perturbation element spans a majority of a distance across the fluid channel.

48. The device as recited in claim 1, wherein the flow perturbation element includes forward and trailing sides that meet at a free end that is within the fluid channel.

49. The device as recited in claim 1, wherein the flow perturbation element extends between abase at One of the side walls and a free end within the fluid channel.

* * * * *

UNITED STATES PATENT AND TRADEMARK OFFICE
CERTIFICATE OF CORRECTION

PATENT NO.       : 7,582,137 B2                                           Page 1 of 1
APPLICATION NO.  : 11/334587
DATED            : September 1, 2009
INVENTOR(S)      : Chen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 744 days.

Signed and Sealed this

Fourteenth Day of September, 2010

David J. Kappos
*Director of the United States Patent and Trademark Office*